US011959195B2

(12) United States Patent
Doneker et al.

(10) Patent No.: US 11,959,195 B2
(45) Date of Patent: Apr. 16, 2024

(54) MICROSCALE COMPOSITE CARBON FIBER FERRITE MICROWAVE ABSORBERS

(71) Applicant: Tangitek, LLC, Portland, OR (US)

(72) Inventors: Robert L. Doneker, Portland, OR (US); Kent G. R. Thompson, Portland, OR (US)

(73) Assignee: Tangitek, LLC, Portland, OR (US)

( * ) Notice: Subject to any disclaimer, the term of this patent is extended or adjusted under 35 U.S.C. 154(b) by 1398 days.

(21) Appl. No.: 16/362,189

(22) Filed: Mar. 22, 2019

(65) Prior Publication Data

US 2020/0299868 A1 Sep. 24, 2020

(51) Int. Cl.

| | |
|---|---|
| ***D01F 11/14*** | (2006.01) |
| ***D01F 9/12*** | (2006.01) |
| ***D01F 11/12*** | (2006.01) |
| ***D06M 11/49*** | (2006.01) |
| ***D06M 23/08*** | (2006.01) |
| ***H01Q 17/00*** | (2006.01) |
| *D06M 101/40* | (2006.01) |

(52) U.S. Cl.

CPC ................ *D01F 11/14* (2013.01); *D01F 9/12* (2013.01); *D01F 11/123* (2013.01); *D06M 11/49* (2013.01); *D06M 23/08* (2013.01); *H01Q 17/005* (2013.01); *D06M 2101/40* (2013.01)

(58) Field of Classification Search

CPC .......... D01F 11/14; D01F 9/12; D01F 11/123; D06M 11/49; D06M 23/08; D06M 2101/40; H01Q 17/005

See application file for complete search history.

(56) References Cited

U.S. PATENT DOCUMENTS

| | | | | |
|---|---|---|---|---|
| 4,923,736 A * | 5/1990 | Hiza | ........................ | B32B 25/20 428/447 |
| 5,307,075 A | 4/1994 | Huynh | | |
| 2008/0283290 A1* | 11/2008 | Niino | .................. | H05K 9/0001 174/350 |

OTHER PUBLICATIONS

"Ionizing & Non-Ionizing Radiation," U.S. Environmental Protection Agency, Sep. 10, 2015 (3 pages). Retrieved from Internet Archive website: https://web.archive.org/web/20150910122008/http://www.epa.gov/radiation/understand/ionize_nonionize.html.

"LifeWave Matrix 2—Reduce Your Exposure to Cell Phone Radiation Now," product description, Copyright © 2016, LifeWave, Inc. (3 pages). Retrieved from Internet Archive website: https://web.archive.org/web/20160927153157/http://lifewave.com/usa-en/matrix.asp.

"SYB Pocket Patch to Shield Cell Phone EMF Radiation," product description, copyright © 2017, Shield Your Body with SYB™ (8 page). Retrieved from Internet Archive website: https://web.archive.org/web/20170110091741/http://www.shieldyourbody.com/product/pocket-patch-to-shield-cell-phone-emf-radiation/.

"Pong Radiation Protection Cases for iPhone, iPad and Samsung Galaxy," product description, copyright © 2019, Pong Research Corporation (3 pages). Retrieved from Internet Archive website: https://web.archive.org/web/20190216185444/http://www.pongcase.com/.

(Continued)

*Primary Examiner* — Cephia D Toomer

(74) *Attorney, Agent, or Firm* — Miller Nash LLP

(57) ABSTRACT

A carbon fiber composite, including a carbon fiber not connected to a substrate, an insulative layer coating at least a portion of the carbon fiber, and a material deposited on at least a portion of the insulative layer. The carbon fiber deposit may be used, for example, in adjustable Fresnel lenses and horn antennas.

8 Claims, 7 Drawing Sheets

(56) References Cited

OTHER PUBLICATIONS

"Radiofrequency and Microwave Radiation: Health Effects," Occupational Safety & Health Administration, Feb. 9, 2019 (3 pages). Retrieved from Internet Archive website: https://web.archive.org/web/20190209143307/https://www.osha.gov/SLTC/radiofrequencyradiation/healtheffects.html.

"Reach Antenna—Attachable Antenna for iPhone 6 & iphone 6 Plus," product description, copyright © 2017, Reach Antenna (7 pages). Retrieved from Internet Archive website: https://web.archive.org/web/20171027065407/http://www.reachantenna.com/.

"The science: How Bodywell reduces cellphone radiation absorption," product description, copyright © 2018, Bodywell (2 pages). Retrieved from Internet Archive website: https://web.archive.org/web/20181017231939/http://www.bodywellchip.com/how-it-works/science.

Group, "How to Protect Yourself from Dangerous Cell Phone Radiation," Global Healing Center, Dec. 2, 2014 (4 pages). Retrieved from Internet Archive website: https://web.archive.org/web/20170524101604/http://www.globalhealingcenter.com/natural-health/how-to-protect-yourself-from-dangerous-cell-phone-radiation/.

Wikipedia contributors. "Ground plane." Wikipedia, The Free Encyclopedia. Apr. 3, 2018 (4 pages). Retrieved from Internet Archive website: https://web.archive.org/web/20190312232709/https://en.wikipedia.org/wiki/Ground_plane.

Wikipedia contributors. "Passive radiator." Wikipedia, The Free Encyclopedia. Apr. 29, 2018 (2 pages). Retrieved from: https://en.wikipedia.org/w/index.php?title=Passive_radiator&oldid=838876073.

Wikipedia contributors. "Yagi-Uda antenna." Wikipedia, The Free Encyclopedia. Mar. 21, 2019 (15 pages). Retrieved from Internet Archive website: https://web.archive.org/web/20190402041709/http://en.wikipedia.org/wiki/Yagi%E2%80%93Uda_antenna.

* cited by examiner

MICROSCALE COMPOSITE CARBON FIBER FERRITE MICROWAVE ABSORBERS

BACKGROUND

There are several different types of microware absorber material systems available on the market today for the absorption and/or transfer of electromagnetic noise. Materials in the market include lossy foam block pyramidal type absorbers, which are one of the highest performance microwave surface reflection attenuators. Multiple sheets of carbon impregnated foam can also be used to create flat laminate absorbers. Reflections can occur at any foam surface, the magnitude of the reflection being dependent on the density of the material. Variations include high-power absorbers of a honeycomb substrate made from a phenolic-based material. Lossy films are coated on the walls of the honeycomb for effective absorption of incident electromagnetic waves.

Embodiments of the disclosure address these and other deficiencies of the prior art.

BRIEF DESCRIPTION OF THE DRAWINGS

Aspects, features and advantages of embodiments of the present disclosure will become apparent from the following description of embodiments in reference to the appended drawings in which.

DESCRIPTION

Embodiments disclosed herein relate to the formation and application of microscale magnetic ferrite chokes on carbon fibers for microwave energy absorption. Carbon fiber is conductive in microwave frequencies, such as 300 MHz through 300 GHz. As such, carbon fibers have historically been used for microwave antennas. Embodiments of this disclosure, however, use carbon fibers to create a microwave absorber material and/or coating.

Figure 1:
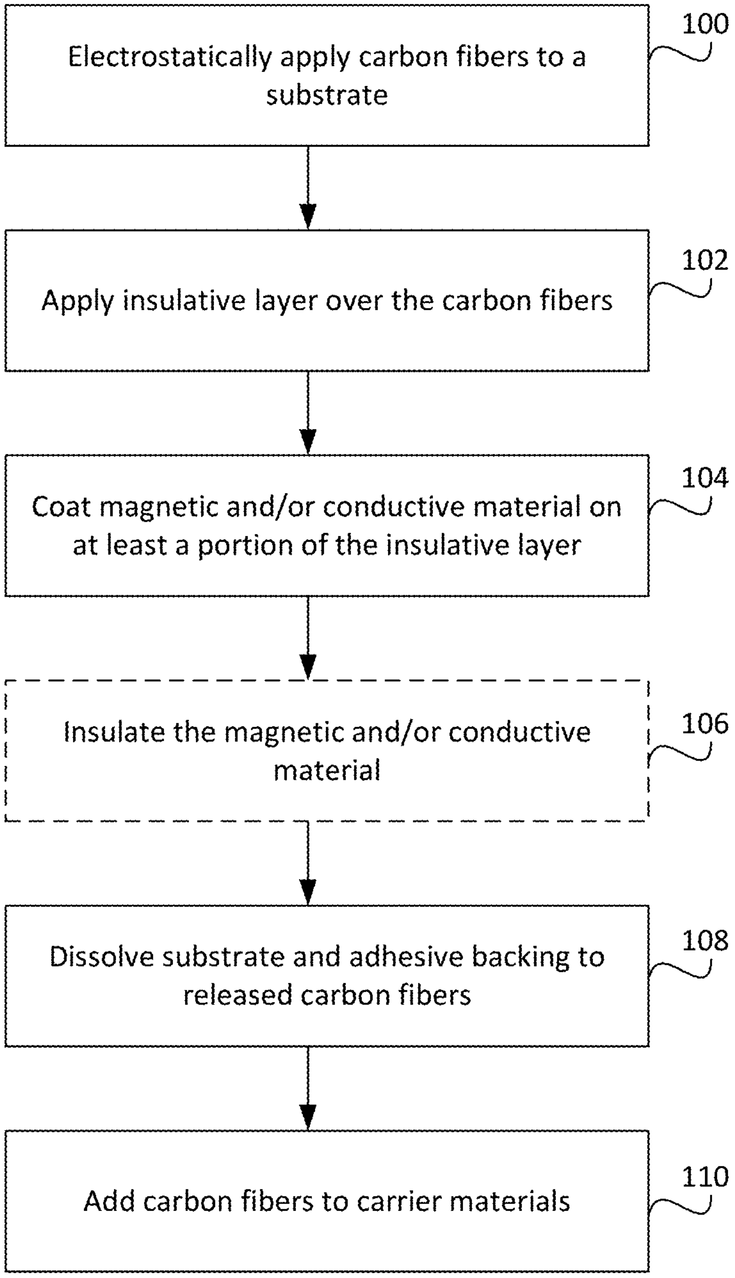
FIG. 1 is a flow chart illustrating a process for harvesting coated carbon fibers according to embodiments of the disclosure.

FIG. 1 is a flow chart illustrating a process for forming a treated carbon fiber, according to embodiments of the disclosure. Initially, Polyacrylonitrile (PAN) carbon fibers, approximately 1 mm to 10 mm in length, are electrostatically applied 100 to a substrate backing having an adhesive layer thereon. The carbon fibers may be applied such that they are in a near-vertical orientation. Further, the carbon fibers may be applied in such a manner that at least that at least two or more of the carbon fibers extend from the substrate backing at different angles.

In operation 102, an insulative layer may be applied over the carbon fibers to cover at least 90% of the carbon fibers, forming insulated carbon fibers. The insulative layer is applied while the carbon fibers are still attached to the substrate backing. The insulative layer may be, for example, a dielectric material, such as, but not limited to, polyvinyl chloride (PVC), PTFE, polyvinyl acetate (PVA), epoxy, silicone, polyimides, urethanes, acrylics, cyanoacrylates, rubber, neoprene, isoprene, etc.

In operation 104, a material, such as a magnetic and/or conductive material, may be coated on at least a portion of the insulative layer, such that beads of the material form at various positions along the length of the insulative layer. The material may be any magnetic and/or conductive material, such as, but not limited to, carbonyl iron, ceramic iron ferrites, cobalt, nickel, boron, Niobium, neodymium, or other members of the Lanthanum series. That is, some of the insulated carbon fibers may have more than one bead of magnetic and/or conductive material 300 coated on the insulative layer 200. In some embodiments, in optional operation 106, the magnetic and/or conductive material 300 may also be insulated with a dielectric material to prevent corrosion.

In operation 108, the substrate backing and the adhesive layer may then be dissolved with a suitable solvent, such as, but not limited to, heat, alcohol, water, methyl ethyl ketone (MKE), etc. to harvest the coated or treated carbon fibers. The coated carbon fibers have a "dumbbell" structure. That is, the harvest coated carbon fibers 400 consists of insulated carbon fibers with beads of magnetic and/or conductive materials surrounding the carbon fibers at various positions along the length of the fiber. The harvested coated carbon fibers 400 may act as antennas, while the magnetic material beads 300 act like chokes. The harvested coated carbon fibers 400 can then absorb microwave energy through both dielectric and magnetic losses.

In operation 110, the treated carbon fibers may be added to other carrier materials to create a microwave absorber material and/or coating. For example, the treated carbon fibers may be added to paints, coatings, epoxy, silicone, rubber, injection molding plastic feed materials, neoprene, polyurethanes, melamine foams, Fresnel plate lens material, etc. Because the treated carbon fibers are magnetic, the carbon fibers may be aligned in the carrier material by application of a magnetic field to optimize the microwave absorption properties of the carrier material with the added carbon fibers.

Figure 2:
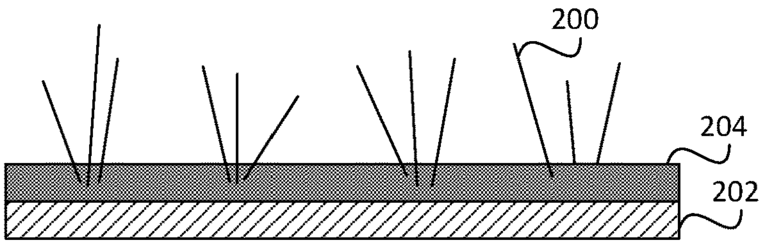
FIG. 2 illustrates electrostatically applying carbon fibers to a substrate.

FIG. 2 illustrates operation 100 for forming carbon fibers according to embodiments of the disclosure. As can be seen in FIG. 2, the carbon fibers 200 can be applied in such a manner that at least two or more of the carbon fibers 200 extend in a near-vertical manner from a substrate backing 202 having an adhesive layer 204 at different angles.

Figure 3:
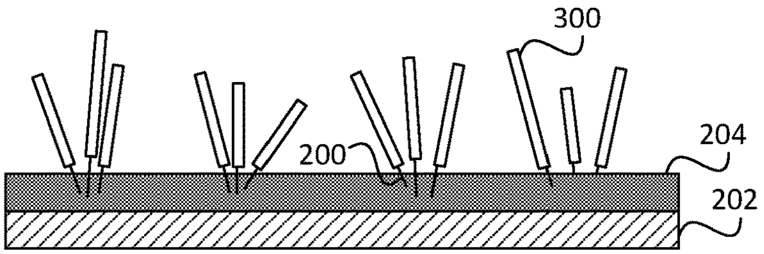
FIG. 3 illustrates applying an insulative material on the carbon fibers.

FIG. 3 illustrates coating or covering the carbon fibers 200 with an insulative layer 300, while the carbon fibers 100 are still attached to the substrate backing 202. As mentioned above, the insulative layer 200 may be applied to cover at least 90% of the carbon fibers to form insulated carbon fibers.

Figure 4:
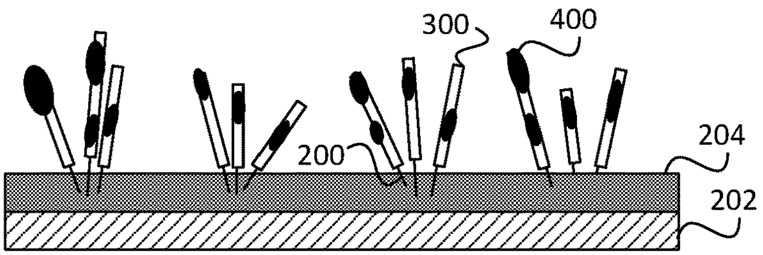
FIG. 4 illustrates coating the insulated carbon fibers with a magnetic and/or conductive material.

As illustrated in FIG. 4, magnetic and/or conductive materials 400 may be coated on the insulative layer 400, such that various beads form at various positions along the length of the insulative layer 400. That is, some of the insulated carbon fibers may have more than one bead of magnetic and/or conductive material 400 coated on the insulative layer 300.

Figure 5:
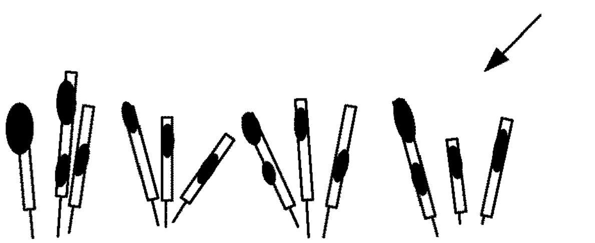
FIG. 5 illustrates harvested carbon fibers when the substrate of FIG. 4 is dissolved.

FIG. 5 illustrates the harvested treated fibers 500. The harvested treated carbon fibers 500 consists of insulated carbon fibers with beads of magnetic and/or conductive materials surrounding the carbon fibers at various positions along the length of the fiber. The harvested coated carbon fibers 500 may act as antennas, while the magnetic material beads 400 act like chokes. The harvested treated carbon fibers 500 can then absorb microwave energy through both dielectric and magnetic losses.

Further, harvested treated carbon fiber 500 has an anisotropic effect with respect to the applied electromagnetic wave. The incident wave has both an electric field (E-field) and a magnetic field (H-field). Electromagnetic waves will tend to pass along the axis of the harvested treated carbon fibers 500. E-field waves co-linear to the harvested treated carbon fibers 500 will be pass through with insertion loss. Waves tend to not pass through when harvested treated carbon fibers 500 are perpendicular to the E-field—rather, they will tend to reflect. Conventional absorber materials are not anisotropic.

As mentioned above, the treated carbon fibers 500 may be used in a Fresnel plate, also referred to herein as zone plate, lens material. A zone plate lens is a device which may be used to focus electromagnetic wave energy. Unlike lenses or curved mirrors, however, zone plates use diffraction instead of refraction or reflection. A zone plate having the treated carbon fibers 500, as discussed in more detail below, may be used for microwave radiation in the 1 GHz to 1 THz frequency range. Conventional zone plates are not capable of changing a focal point of the zone plate or lens.

Figure 6:
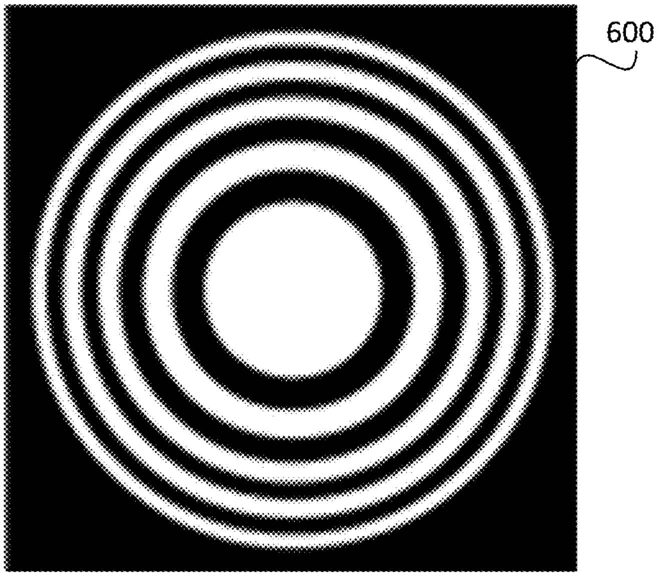
FIG. 6 illustrates an example Fresnel plate.

As illustrated in FIG. 6, a zone plate 600 consists of a set of one or more radial symmetric rings, known as Fresnel zones, which alternate between absorptive 602 and transparent 604. In zone plate 600, the microwaves hitting the zone plate 600 will diffract around the absorptive zones 602. The zones 602 and 604 may be spaced so that the diffracted microwaves constructively interfere at the desired focus, creating a region of concentrated microwave energy.

Embodiments of the disclosure include constructing a microwave zone plate lens 700 using the harvested treated carbon fibers 500, discussed above. The harvested treated carbon fibers 500 may be used to create diffractive zones within a dielectric material.

Figure 7A:
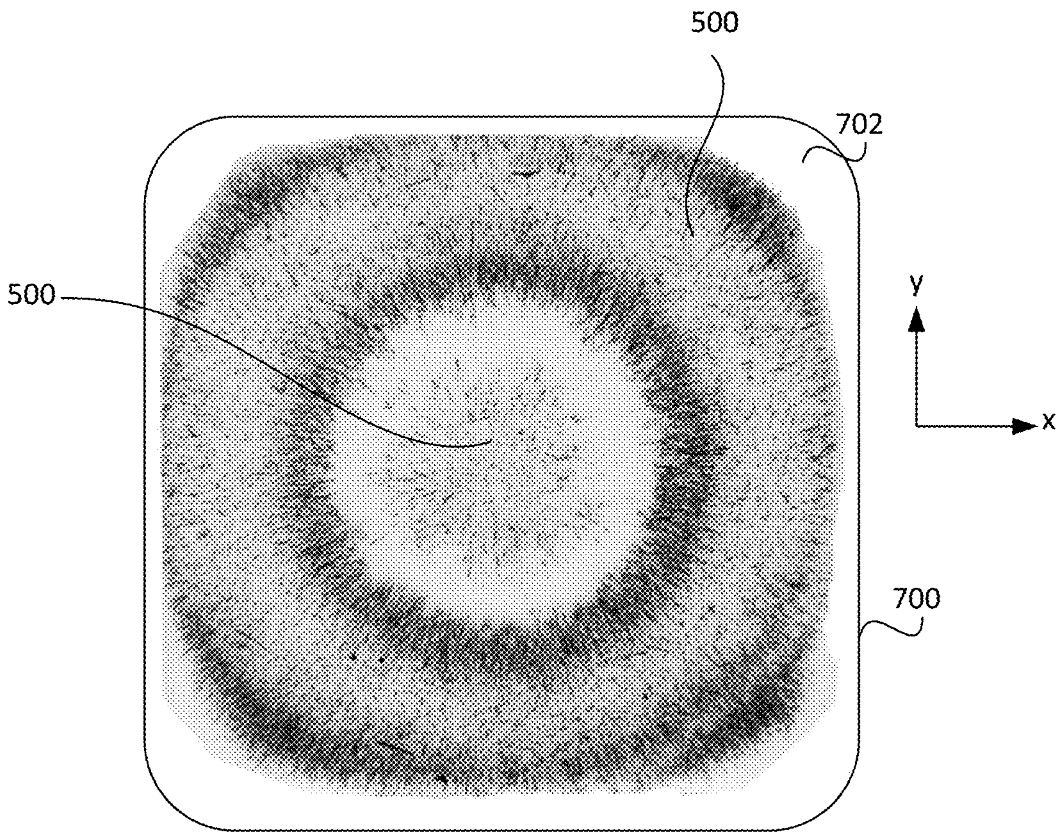
FIGS. 7A and 7B illustrates an example Fresnel plate according to embodiments of the disclosure.
Figure 7B:
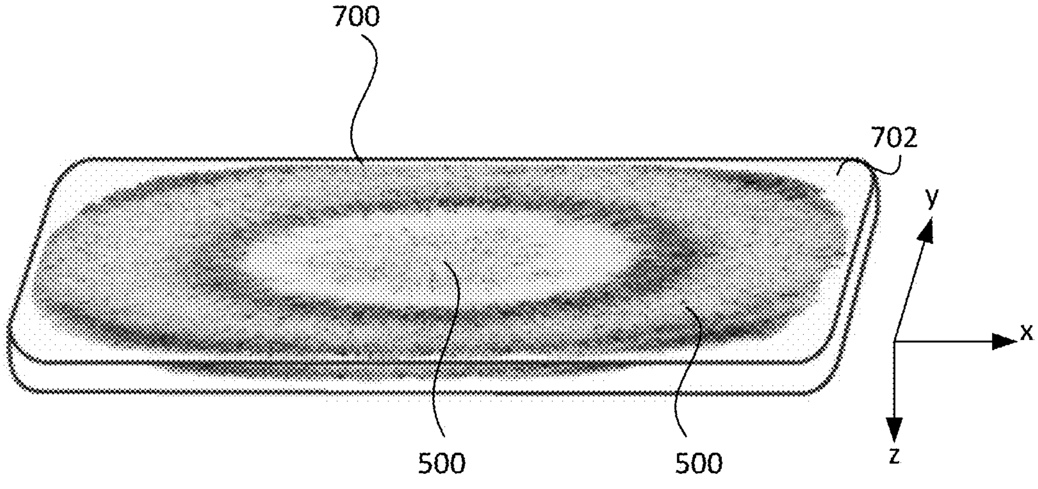

FIGS. 7A and 7B illustrate the microwave zone plate lenses 700 according to embodiments of the disclosure. The harvested treated carbon fibers 500 are encapsulated in a liquid elastomeric material 702, such as, but not limited to, silicone, epoxy, polyurethane, polyvinyl acetate, neoprene, melamine foam, etc. The harvested treated carbon fibers 500 may be placed in an orientation within the liquid elastomeric material 702. That is, the treated carbon fibers 500 may be arranged in random orientations or all in the same direction.

In some embodiments, after being encapsulated in the liquid elastomeric material 702, the harvested treated carbon fibers 500 may be subjected to a magnetic field. When subjected to the magnetic field, the harvested treated carbon fibers 500 align with the magnetic field. Accordingly, the harvested treated carbon fibers 500 may be aligned in any one of the x-axis, y-axis, or z-axis, depending on how the magnetic field is applied. The different zones of the zone plate lenses 700 may also have harvested treated carbon fibers 500 in different orientations. For example, one zone may have randomly oriented harvested carbon fibers 500, while another zone may have harvested carbon fibers 500 aligned in the z-axis. That is, each of the zones of each of the zones plates may have harvested treated carbon fibers 500 in different or the same orientations. The harvested treated carbon fibers 500 may be subjected to the magnetic field until the liquid elastomeric material 702 is cured or nearly cured.

Figure 8:
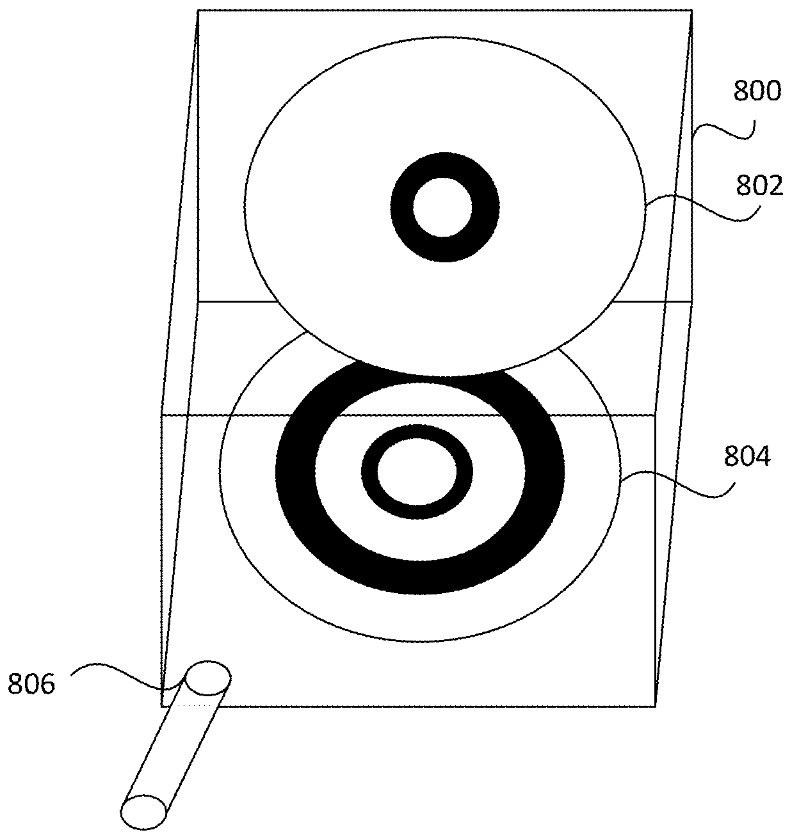
FIG. 8 illustrates an adjustable focus microwave lens according to embodiments of the disclosure.

With Fresnel lenses 700 constructed or structured with an elastomeric material, an adjustable focus microwave lens may be created, as illustrated in FIG. 8. A chamber 800 may include zone plates 802 and 804, similar to those discussed above with respect to FIGS. 7A and 7B, which are constructed or structured with an elastomeric material.

The chamber 800 includes an opening 806 structured to mate with a pump (not shown). The pump may be used to pump air into the chamber 800, expanding and stretching the space between the zones in each of the zone plates 802 and 804. The distance between the zone plates 802 and 804 is also increased. This allows for the focal lens of the zone plates 802 and 804 to vary with the amount of pressure inside the chamber.

Although two zone plates are illustrated in FIG. 8, only a single zone plate or up to four zone plates may be provided in the chamber 800. For example, four different zone plates may be provided on a chamber to vary the absorption and transparent regions of the zone plates. In some embodiments, only three chambers have zone plates, so a user may decide between using a single zone plate, which may be expanded to a desired focal point, or using two zone plates in conjunction, such as shown in FIG. 8.

Figure 9:
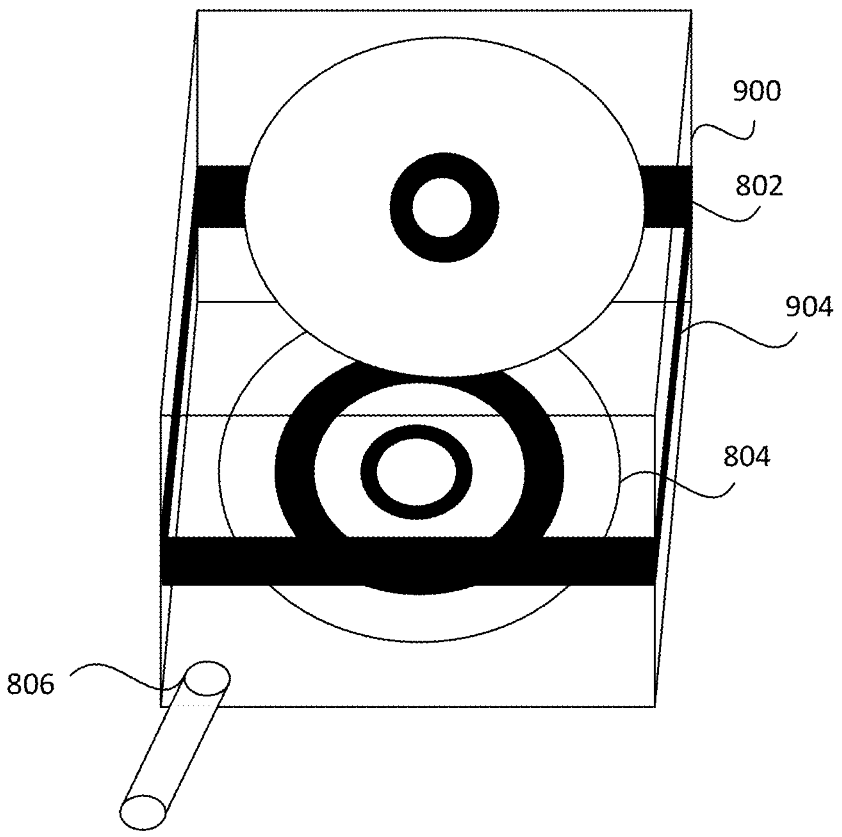
FIG. 9 illustrates another adjustable focus microwave lens according to embodiments of the disclosure.

FIG. 9 illustrates another example of a Fresnel lens, which may be used, for example, with a horn antenna. The Fresnel lens 900 is similar to the Fresnel lens 800 and like components are given the same reference numbers. The Fresnel lens 900, however, includes an outer layer 902 of carbon fibers around the exterior portion of the chamber 800 between the two zone plates 802 and 804. That is, the outer layer 902 is comprised of a number of harvested treated carbon fibers 500, similar to the zones of the zone plates.

Figure 10:
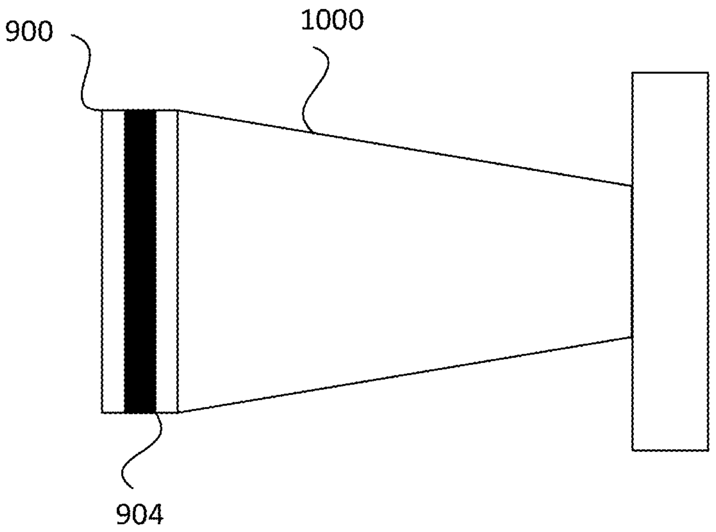
FIG. 10 illustrates a horn antenna according to some embodiments of the disclosure.

Fresnel lens 900 may be used in conjunction with a horn antenna 1000, as illustrated in FIG. 10. A horn antenna or microwave horn is an antenna that consists of a flaring metal waveguide shaped like a horn to direct radio waves in a beam. Horns are widely used as antennas at UHF and microwave frequencies, above 300 MHz.

As can be seen in FIG. 10, the Fresnel lens 900 may be placed at the end of the horn antenna 1000. The Fresnel lens 900 may have air added to adjust the focus of the zone plates, as needed and as discussed above. An edge of the horn antenna creates a discontinuity of the electromagnetic wave propagating through a horn wave guide section of the horn antenna.

The outer layer 902 of the Fresnel lens 900 is perpendicular to the electromagnetic wave on the edge of the horn antenna 1000. This results in the outer layer 902 directing energy radiated from the side to the front of the horn antenna 1000. Since the harvested treated carbon fibers 500 are not coupled with the edge of the horn antenna 1000 itself, edge coupling can be reduced.

In this disclosure, the term "using" means "using at least in part." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as "about," "approximately," "substantially," and "generally," are used to indicate a possible variation of ±10% of a stated or understood value The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A microwave absorber, comprising:

a carrier material; and a plurality of treated carbon fibers in the carrier material aligned in a vertical direction, each of the treated carbon fibers including:

a carbon fiber, an insulative material coating at least a portion of the carbon fiber, and a material that is at least one of conductive and magnetic deposited on at least a portion of the insulative material.

2. The microwave absorber of claim 1, wherein the carrier material includes at least one of a paint, a coating, an epoxy, a silicone, rubber, injection molding plastic feed materials, neoprene, polyurethanes, Fresnel plate lens material, and melamine foams.

3. The microwave absorber of claim 1, wherein the material that is at least one of conductive and magnetic is ferrite.

4. The microwave absorber of claim 1, wherein each of the treated carbon fibers also includes a dielectric coating on the material that is at least one of conductive and magnetic.

5. The microwave absorber of claim 1, wherein the material that is at least one of conductive and magnetic is deposited on at least a portion of the insulative material in at least two positions.

6. The microwave absorber of claim 1, wherein each of the treated carbon fibers are 10 mm or less in length.

7. The microwave absorber of claim 1, wherein the insulative material further comprises a dielectric.

8. The microwave absorber of claim 1, further comprising a dielectric coating on the material that is at least one of magnetic and conductive.

* * * * *